United States Patent
Galloway et al.

(10) Patent No.: US 9,148,347 B2
(45) Date of Patent: Sep. 29, 2015

(54) NETWORK DATA ANALYSIS

(71) Applicant: Fishy & Madge Pty Ltd., Forster, New South Wales (AU)

(72) Inventors: John Julian Galloway, Mudgee (AU); Adam Broadway, Burlingame, CA (US)

(73) Assignee: FISHY & MADGE PTY LTD., Forster, New South Wales (AU)

( * ) Notice: Subject to any disclaimer, the term of this patent is extended or adjusted under 35 U.S.C. 154(b) by 330 days.

(21) Appl. No.: 13/875,925

(22) Filed: May 2, 2013

(65) Prior Publication Data

US 2014/0207945 A1    Jul. 24, 2014

Related U.S. Application Data

(60) Provisional application No. 61/642,501, filed on May 4, 2012.

(51) Int. Cl.
  *G06F 15/16* (2006.01)
  *H04L 12/24* (2006.01)
  *H04L 29/08* (2006.01)

(52) U.S. Cl.
  CPC ............ *H04L 41/142* (2013.01); *H04L 41/147* (2013.01); *H04L 67/22* (2013.01); *H04L 41/12* (2013.01); *H04L 41/145* (2013.01)

(58) Field of Classification Search
  CPC .... H04L 41/142; H04L 41/145; H04L 41/147
  USPC .......... 709/200–203, 217–227; 370/216, 252, 370/254, 255
  See application file for complete search history.

(56) References Cited

U.S. PATENT DOCUMENTS

| | | | | |
|---|---|---|---|---|
| 7,356,599 | B2 * | 4/2008 | Pochon et al. | 709/229 |
| 8,918,876 | B2 * | 12/2014 | Larsson et al. | 726/23 |
| 2008/0109730 | A1 | 5/2008 | Coffman et al. | |
| 2012/0060219 | A1 * | 3/2012 | Larsson et al. | 726/23 |
| 2014/0143419 | A1 * | 5/2014 | Vyatkin et al. | 709/224 |
| 2014/0337971 | A1 * | 11/2014 | Casassa Mont et al. | 726/22 |

OTHER PUBLICATIONS

Rustin, Randall (eds.), Data Base Systems. Courant Computer Science Symposium 6, Oct. 1972, 33-64, Prentice-Hall, Inc., Englewood Cliffs, N.J.

Brandes, Ulrik and Erlebach, Thomas (eds.), Network Analysis. Methodological Foundations, Feb. 2005, (pp. 16-61, 112-142 and 178-215), Springer-Verlag, Berlin Heidelberg.

* cited by examiner

*Primary Examiner* — Moustafa M Meky
(74) *Attorney, Agent, or Firm* — Morris, Manning & Martin, LLP; Christopher W. Raimund

(57) ABSTRACT

Apparatus for use in analyzing network data, the apparatus including an electronic processing device that determines network data representing a network having a number of nodes and links between the nodes, selects a model in accordance with a data type associated with the network data, the model being indicative of at least one trigger for a behavior of interest, selected network metrics and a mathematical relationship relating network nodes to the at least one trigger using the selected network metrics and determines at least one trigger associated with the network data, determines the selected metrics for the network data and uses the mathematical relationship, the selected network metrics and the identified at least one trigger to determine predicted nodes, the predicted nodes being nodes predicted to exhibit behavior of interest.

20 Claims, 8 Drawing Sheets

NETWORK DATA ANALYSIS

This application claims the benefit of Provisional U.S. Patent Application Ser. No. 61/642,501, filed on May 4, 2012, which is incorporated by reference herein in its entirety.

BACKGROUND OF THE INVENTION

The present invention relates to a method and apparatus for use in analysing network data, and in one example to analysing network data to determine nodes predicted to exhibit behaviour of interest.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Coincident with the rapid recent rise in usage of social network platforms such as Facebook and Twitter, is an increased recognition of the importance of peer-to-peer relationships generally and Social Network Analysis (SNA) in particular.

Whilst methods of SNA are known, these have typically involved analysing modest volumes of data having a network structure (comprising nodes and relationships or edges) and, most importantly, as a static network where the time element is disregarded altogether or as a network with only one or a small number of broad time slices. SNA metrics are then computed on the time slices with little or no regard to the temporal nature of the social relationships that ebb and flow to form a changing network. Consequently, the dynamics of network performance and the over-time behaviour of specific nodes and specific relationships are largely disregarded.

Since the rise of social media and mobile phone traffic, data suitable for SNA is now far more voluminous and extends to much more dynamic relationships. This means that the social networks generated from the data are constantly changing in composition as the patterns of relationships between the nodes change, and the nodes themselves and the communities or groups that they might be detected to belong to at any one time are present or absent at different times. The temporal dimension brings many complications to meaningful analysis and hence has been poorly dealt with by traditional SNA methods to date, yet must be integral to the SNA methods of modern commerce especially when making use of SNA for predictive purposes.

Marketers have an interest in identifying which nodes are most influential and when, and to whom they should target messages in order to maximize the spread of influence. The identification of key nodes, persons in human networks, to whom messages can be most effectively directed for minimal cost and maximal effect is increasingly recognized by advertisers and marketers. However, the notion of influence extends from purely human-based influence to machine or device-based influence. It is recognized that a property of device-to-device networks common with human social networks is relational transitivity (see, for example, Codd, E. F. "Further Normalization of the Data Base Relational Model." (Presented at Courant Computer Science Symposia Series 6, "Data Base Systems," New York City, May 24th-25th, 1971.) IBM Research Report RJ909 (Aug. 31, 1971). Republished in Randall J. Rustin (ed.), *Data Base Systems: Courant Computer Science Symposia Series* 6. Prentice-Hall, 1972. See pages 45-51, which cover third normal form and transitive dependence). Hence, device-to-device influencer predictions incorporating the topology of networks are potentially important for machine networks as well as human social networks, for overcoming problems such as device scaling, bottle necks prediction and proactive resource management.

Furthermore, this broader concept of peer-to-peer (P2P) networks increasingly needs to take account not only of person-to-person networking (as in the SNA tradition) or the machine/device networks alone, but the overlay or intersection of the two. The two classes of networks, people and machines, are not independent. For example, P2P occurs between devices, two humans calling each other on the phone. However underlying this are the cell towers, which also communicate device-to-device. Understanding the behaviour of P2P networking structures, particularly where a migration of people may be occurring (such as at a music festival), the underlying device-to-device infrastructure (cell towers/routers/wifi) will be affected. The human (P2P) migration pattern, augmented by the device-to-device activity, should predict certain events may be occurring, allowing where services can then be proactively up-scaled.

The data volumes of many such networks can be massive. This fact when coupled with the dynamic nature of networks, make it difficult to identify which specific nodes are the key ones to target for the propagation of influence, social pressures on others, and machine networked applications such as device scaling.

Even more difficult is the task of predicting specifically which other nodes in the network will next be influenced by the key ones propagating influence and social pressure. Traditional SNA methods have largely neglected predictions of over-time behavior and the specificity of pinpointing particular customers who will next behave.

Traditionally SNA methods have not been predictive or if they have extended to predictions those predictions have been limited to categories of nodes, not specific ones. For example, all nodes with three or more links to certain others in certain types of networks. All nodes of that particular category may be denoted as having a higher probability of behaving in a certain way but which specific ones will, is often left unspecified.

As a result, SNA has generated interest but is commonly thought not to have realized its full potential and proved to be of only limited value in commercial applications.

SUMMARY OF THE PRESENT INVENTION

In a first broad form the present invention seeks to provide apparatus for use in analyzing network data, the apparatus including an electronic processing device that:
  a) determines network data representing a network having a number of nodes and links between the nodes;
  b) selects a model in accordance with a data type associated with the network data, the model being indicative of:
    i) at least one trigger for a behaviour of interest;
    ii) selected network metrics; and
    iii) a mathematical relationship relating network nodes to the at least one trigger using the selected network metrics; and,
  c) determines at least one trigger associated with the network data;
  d) determines the selected metrics for the network data; and,
  e) uses the mathematical relationship, the selected network metrics and the identified at least one trigger to determine predicted nodes, the predicted nodes being nodes predicted to exhibit behaviour of interest.

Typically for network data from at least one first time period the electronic processing device:
a) calculates a range of different network metrics for the network;
b) determines nodes exhibiting a behaviour of interest;
c) determines potential triggers;
d) determines a mathematical relationship relating the identified nodes to the potential triggers using selected ones of the metrics; and,
e) at least one of defines and refines the model in accordance with the identified triggers, the mathematical relationship and the selected ones of the metrics.

Typically the electronic processing device, determines predicted nodes for at least one second time period subsequent to the at least one first time period.

Typically the electronic processing device:
a) receives data indicative of the network data;
b) segments the data into at least one first time period and at least one second time period.

Typically the mathematical relationship is indicative of a weighted sum based at least partially on the selected network metrics and the at least one trigger, and wherein the electronic processing device:
a) calculates an index for at least some of the nodes using the weighted sum; and,
b) determines the predicted nodes using the index.

Typically the index is at least partially indicative of at least one of a proximity and a connectivity of the respective node to at least one trigger associated with at least one node within the network.

Typically for network data from at least one first time period the electronic processing device:
a) calculates a plurality of indices for at least some of the nodes using a plurality of weighted sums; and,
b) uses the indices and the behaving nodes to at least one of:
  i) select a respective one of the plurality of weighted sums; and,
  ii) modify at least one of the plurality of weighted sums.

Typically the trigger is indicative of at least one of:
a) a node exhibiting a particular behaviour;
b) a node having predefined attributes; and,
c) an event associated with or otherwise connected to at least one node within the network.

Typically the electronic processing device:
a) analyses the network data to determine one or more network structures; and,
b) determines the selected metrics for the network structures.

Typically the network structures include groups of nodes, and wherein the electronic processing device determines the groups based on the connectivity of nodes.

Typically the electronic processing device:
a) determines connectivity metrics representing the connectivity of nodes; and,
b) determines the groups using the connectivity metrics.

Typically the electronic processing device:
a) determines raw data indicative of network data;
b) determines nodes and links in the raw data; and,
c) generates the network data using the nodes and links.

Typically the electronic processing device determines the nodes and links using a defined mapping.

Typically the electronic processing device filters the raw data so that at least some of the raw data is not converted to network data.

Typically the electronic processing device:
a) parses the raw data to identify data variables;
b) determines associations between the data variables and network nodes and links; and,
c) defines a mapping indicative of the associations.

Typically the electronic processing device determines associations between the data variables and network nodes and links using a machine learning algorithm.

In a second broad form the present invention seeks to provide A method for use in analyzing network data, the method including, in an electronic processing device:
a) determining network data representing a network having a number of nodes and links between the nodes;
b) selecting a model in accordance with a data type associated with the network data, the model being indicative of:
  i) at least one trigger for a behaviour of interest;
  ii) selected network metrics; and
  iii) a mathematical relationship relating network nodes to the at least one trigger using the selected network metrics; and,
c) determining at least one trigger associated with the network data;
d) determining the selected metrics for the network data; and,
e) using the mathematical relationship, the selected network metrics and the identified at least one trigger to determine predicted nodes, the predicted nodes being nodes predicted to exhibit behaviour of interest.

BRIEF DESCRIPTION OF THE DRAWINGS

An example of the present invention will now be described with reference to the accompanying drawings, in which:—

DETAILED DESCRIPTION OF THE PREFERRED EMBODIMENTS

An example of a process for use in analysing network data will now be described with reference to FIGS. 1A and 1B.

Figures 1A, 1B:
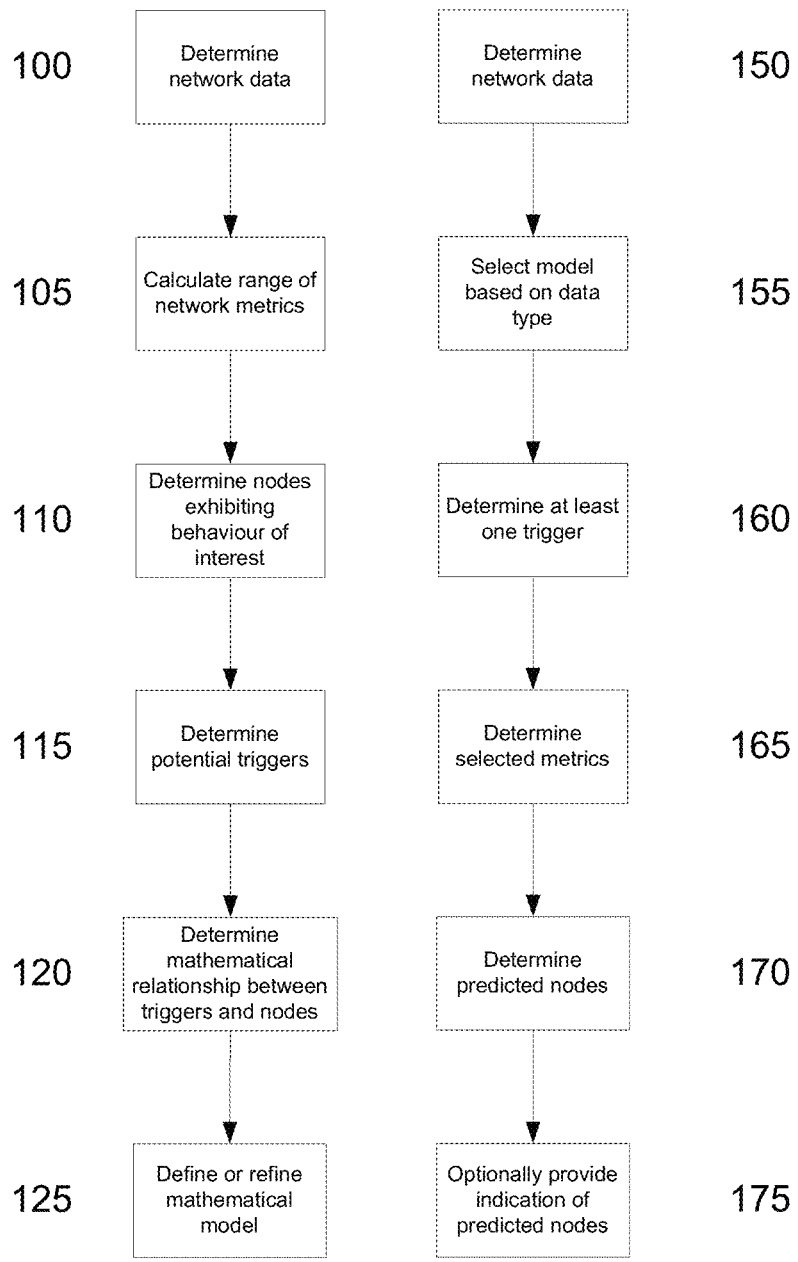
FIG. 1A is a flowchart of an example of a process for use in analysing network data to determine a model.
FIG. 1B is a flowchart of an example of a process for use in analysing network data using a determined model.

In the process of FIG. 1A, data is analysed to determine a model that can be subsequently used in determining or identifying network nodes that is predicted will exhibit behaviour of interest (referred to as "predicted nodes"). To achieve this, the process typically involves analysing data regarding nodes that have previously exhibited behaviour of interest (referred to as "behaving nodes"), together with associated triggers that led to the behaviour.

In this example, at step 100 network data is determined. The network data may be determined in any one of a number of manners depending on the preferred implementation. Typically this will involve having the network data received by an electronic processing device, such as a suitably programmed computer system, which is then used for performing analysis of the network data as will be described in more detail below. The network data may be received as raw data, meaning the data is in a different format to that of the network data, depending for example on the data source, and the raw data may therefore require conversion into network data for further analysis.

The network data may represent any form of network in which a number of nodes are interconnected via respective links. In one example, this can include data relating to human-to-human interactions, such as phone calls, social networking connections, or the like. In this case, nodes in the network represent individuals, with the links representing interactions between the individuals. However, the network data may also include machine-to-machine interaction data, such as communications between computer systems, or other physical devices, such as telecommunications devices, RFID (Radio Frequency Identification) enabled devices or products, as well as human-to-machine interaction data in situations where humans interact directly with machines. It will therefore be appreciated that the network data can relate to a wide variety of scenarios including communicative, internet, chemical and biological networks, and examples will be described in more detail below.

At step 105 the network data is analysed to determine a range of network metrics. The network metrics are used to analyse the network and can include information such as the relative interconnectedness of nodes within the network, information regarding the relative strength and weakness of links, ratios of links between different groups, how links change over time or the like.

The metrics can include SNA metrics, such as network density, node degree, average path length and clustering coefficients. Such SNA metrics are known in the art and are described for example in Brandes, U. and T. Erlebach "Network analysis: methodological foundations". Springer, 2005. Examples of such SNA metrics include:

Betweenness centrality: Number of pathways in the network in which an individual or node is 'in between' two other individuals or nodes. The measure indicates how frequently an individual or node is an intermediate between others.

Clustering coefficient: A measure of the likelihood that two associates of a node are associates themselves. A higher clustering coefficient indicates a greater 'cliquishness'.

Density: The proportion of connections in an individual's network of connections of all possible connections present in the network.

Grouping: A common method for detecting groups and communities in social networks is to make use of the extent to which there is overlap between two nodes sets of contacts. This reflects a weigh for assigning them to the same group; that is, the number of other nodes in the network that are shared as direct contacts between any two nodes.

In addition to calculating known SNA metrics, it is also possible to calculate additional "change" metrics relating to network dynamics, as well as connectivity of groups and other network structures as well as similarity of node attributes. The "change" metrics represent how metrics have changed between different time periods, and can therefore only be determined once multiple time periods are available for analysis. However, once available, the electronic processing device can examine any metric in the different time periods, examine how this has changed and whether this is relevant to identifying predicted nodes. For example, calculating change metrics can help identify when connectedness of a network structure, such as a group, changes, which in turn can indicate fragmentation of the group, meaning nodes may have less influence over each other over time.

The range of different network metrics is typically predefined together with rules for the calculation of the metrics, as will be described in more detail below.

At step 110 behaving nodes, which are nodes exhibiting behaviours of interest, are determined. The behaviour of interest can be any form of behaviour that can be exhibited by the nodes, and could include for example nodes performing certain identified actions, or the like. The manner in which the behaving nodes are determined will depend upon the preferred implementation, and can include for example, examining attributes of network nodes, or receiving information regarding the behaviour of nodes from the supplier of raw data.

At step 115 potential triggers are determined. The potential triggers are anything that can potentially lead to nodes exhibiting the behaviour of interest, and can include other nodes exhibiting behaviour of interest, nodes having predefined attributes or events associated with or otherwise connected to at least one node within the network.

For example, when a trigger occurs, such as a party accepts a marketing offer to purchase an item, or "churn" whereby a party is persuaded to churn to another operator's phone network, this behaviour can be propagated to other nodes in the network. Accordingly, by identifying triggers and the behaving nodes that subsequently exhibit the corresponding behaviour of interest, this allows the influence of triggers on other nodes within the network to be determined.

In the case of human-to-human interactions, triggers can include the behaviour of other nodes, with this causing other nodes to exhibit behaviour of interest due to the tendency of individuals to follow the behaviour of other individuals whom they trust, respect, or are otherwise influenced by. Such trust is often to be found in shared relationships between members of the same community or peer group. Peer pressure is known to manifest itself in the adoption of certain behaviours by others among groups of people, for example teenagers adopting the same dress code.

In the case of nodes in machine and distributed networks, including sensors and other inanimate objects, the distinctly human social factors are not present. However transitivity in the relations is often present in non-human networks, such as sensor networks, as a common mathematical property of the relations over time between nodes. Hence, triggers can refer to a broad range of events, node attributes and behaviours.

Whilst triggers can be identified as nodes that first perform a specific action, or exhibit a particular behaviour, such as responding to offers, or the like, typically triggers will also be required to have evidenced influence or transitivity in relations with other nodes within the network. Accordingly, in one example, triggers may be identified at least in part based on their connectivity to other nodes within the network. In one specific example, triggers may be individuals within a network referred to as behavioural leaders, those being individuals deemed to have influence over other individuals within a network. Accordingly, such leaders can be represented by nodes having the highest degree of connectivity to other nodes within the network or within a particular community or peer group. This connectivity is typically established over multiple links, and hence reflects both direct and indirect connectivity. However, this is not essential, and triggers may also include external events, such as advertising campaigns by competitors, or the like.

Accordingly, it will be appreciated that triggers may be determined in any one of a number of manners, and that in one example, information regarding potential triggers is received together with the raw data, but may also be determined from an analysis of the network.

At step 120 a mathematical relationship relating the behaving nodes to the triggers using selected ones of the metrics is determined. The selected metrics will vary depending on the preferred implementation and the type of network data being analysed. For example, different metrics will typically be relevant when considering mobile phone calls as opposed to machine sensor network linkages. The nature of the mathematical relationship and the manner in which the relationship is determined will also vary depending on the nature of the network data. In one example, a plurality of mathematical relationships are predefined, with these being selected and/or modified to best represent the relationship between the triggers and the behaving nodes.

In one example, the mathematical relationship is indicative of a weighted sum based at least partially on selected network metrics and the at least one trigger. In this example, the electronic processing device calculates a plurality of indices for at least some of the nodes using a plurality of weighted sums. The electronic processing device then uses the indices and the behaving nodes to select a respective one of the plurality of weighted sums or modify at least one of the plurality of weighted sums. Thus, for example, the electronic processing device can compare index scores calculated using different weighted sums, and then identify the weighted sum for which the index score distinguishes behaving nodes from other nodes in the network.

Accordingly, this process allows the electronic processing device to identify selected ones of the metrics and a weighted sum of the metrics that best represents the influence of triggers on the behaviour of nodes. This, in turn, allows the electronic processing device to define or refine a mathematical model at step 125, the model being indicative of at least one trigger for a behaviour of interest, the selected network metrics the mathematical relationship relating the behaving nodes to the at least one trigger using the selected network metrics.

Once the mathematical model has been defined, this allows predicted nodes, those being nodes predicted to exhibit behaviour of interest, to be determined, as will now be described with reference to FIG. 1B.

In this example, at step 150 the network data is again determined, in a manner similar to that described above. At step 155, a model is selected based on a data type for the network data. Thus, it will be appreciated that the process of FIG. 1A would typically be used to determine a respective model for different network data, with the electronic processing device selecting the respective model dependent on the type of data currently being analysed.

At step 160, one or more potential triggers within the data are determined. As set out above, the triggers can include nodes exhibiting behaviour of interest, nodes with specific attributes, external events, or the like. These may therefore be identified from the network data, or other information supplied together with the network data.

At step 165, the selected metrics defined by the model are determined, before being used together with the mathematical model and the at least one trigger to determine predicted nodes, the predicted nodes being nodes predicted to exhibit behaviour of interest.

In this regard, the predicted nodes are nodes within the network that are most likely to be influenced by or are recipients of transitive relations with triggers. Predicted nodes can typically be predicted based on the selected network metrics and features of the network including dynamic metrics representing how features of the network "change" over time, and in particular, by combining particular metrics in accordance with the model.

Once predicted nodes have been determined an indication of these can optionally be provided at step 175.

Accordingly, performing the above described process allows network data from one or more first time periods to be analysed to determine or refine a model that represents a relationship between triggers and behaving nodes that exhibit behaviour of interest. Once the model has been determined, this can be used to analyse data in one or more subsequent time periods to determine predicted nodes that are predicted to exhibit behaviour of interest.

Thus, the above described process can be used to identify nodes that are predicted to exhibit behaviour of interest by taking into account previous behaviour within the network, and in particular, the response of nodes to previous triggers. Consequently the predicted nodes are identified based on temporal behaviour of the network, as well network relational properties, such as transitivity. Thus, precedence of an observed and particular behaviour relative to triggers can be used to predict subsequent behaviours within the network.

The above described process can be performed utilising a suitably programmed computer system that performs analysis of network data to predict predicted nodes. An indication of these predicted nodes, can then be provided to a user allowing the user to take certain action.

Thus, for example a communications company may identify behavioural leaders that switch service providers. In this instance the communications company can perform the above described analysis process to predict nodes corresponding to individuals that will be the next individuals to leave their current service provider. The communications company can then provide targeted marketing directed towards the predicted nodes in order to attempt to prevent them from leaving the communications network provider.

Additionally, and/or alternatively, the service provider could attempt to positively influence the behavioural leaders, knowing that modifications in the behaviour of the behavioural leaders can be propagated to other individuals in the network, thereby making advertising more effective.

It will be appreciated from the above example that the network data is typically analysed in a dynamic fashion, with the network data including time series and "change" data. Thus, in one example, calculated metrics will include changes in metric values between subsequent time periods, allowing the model to take into account the dynamic nature of the network. In any event, the model and metrics that best represent the relationship between triggers and predicted nodes can be identified by analysing and learning the network behaviours across one or more time periods, with the identified model and associated metrics then being used to predict predicted nodes in one or more subsequent time periods.

This process can be performed in an iterative fashion, so that after predicted nodes have been predicted, the results of the prediction can be compared to actual behaviour over subsequent time periods, with the comparison being used to refine the model and selected metrics. This can be repeated to enhance the effectiveness of the analysis process. In one particular example, received time series data can be divided into a number of time periods, with analysis being performed on successive time periods separately, allowing the model to be iteratively refined to a high degree of accuracy.

As mentioned above, the network data may be obtained as raw data, which is broadly defined as any data in a format not suitable for direct analysis, and which has typically been received directly from an external source. Such raw data can include communications logs indicative of communications over a communications network, data regarding interaction between users of social media, or machine networks, or biological and chemical network data and the like. In this instance, in which case nodes and links in the raw data are determined, with these being used to generate the network data.

The nodes and links in the raw data may be identified using a defined mapping, which maps specific variables in the raw data to corresponding nodes and links in the network data. However, if a mapping if not known, for example the first time a particular type of raw data is to be analysed, then alternatively the raw data can be parsed to identify variables contained therein, with associations then being determined between the variables and network nodes and links. These associations can be identified utilising any suitable technique such as through the use of pattern matching, machine learning algorithms, or the like. Additionally and/or alternatively, this may involve a manual review of variables identified in the data. Once associations have been determined, these can then be used to define a mapping indicative of the associations, allowing this mapping to be used the next time the particular type of data is received for analysis.

Typically the above described process involves analysing the network data to identify one or more network structures in the form of groupings, such as peer groups, community groups, or the like. The network structures are identified to allow metrics to be determined for the identified network structures as these can provide greater information than analysis of the network as a whole.

Figure 2:
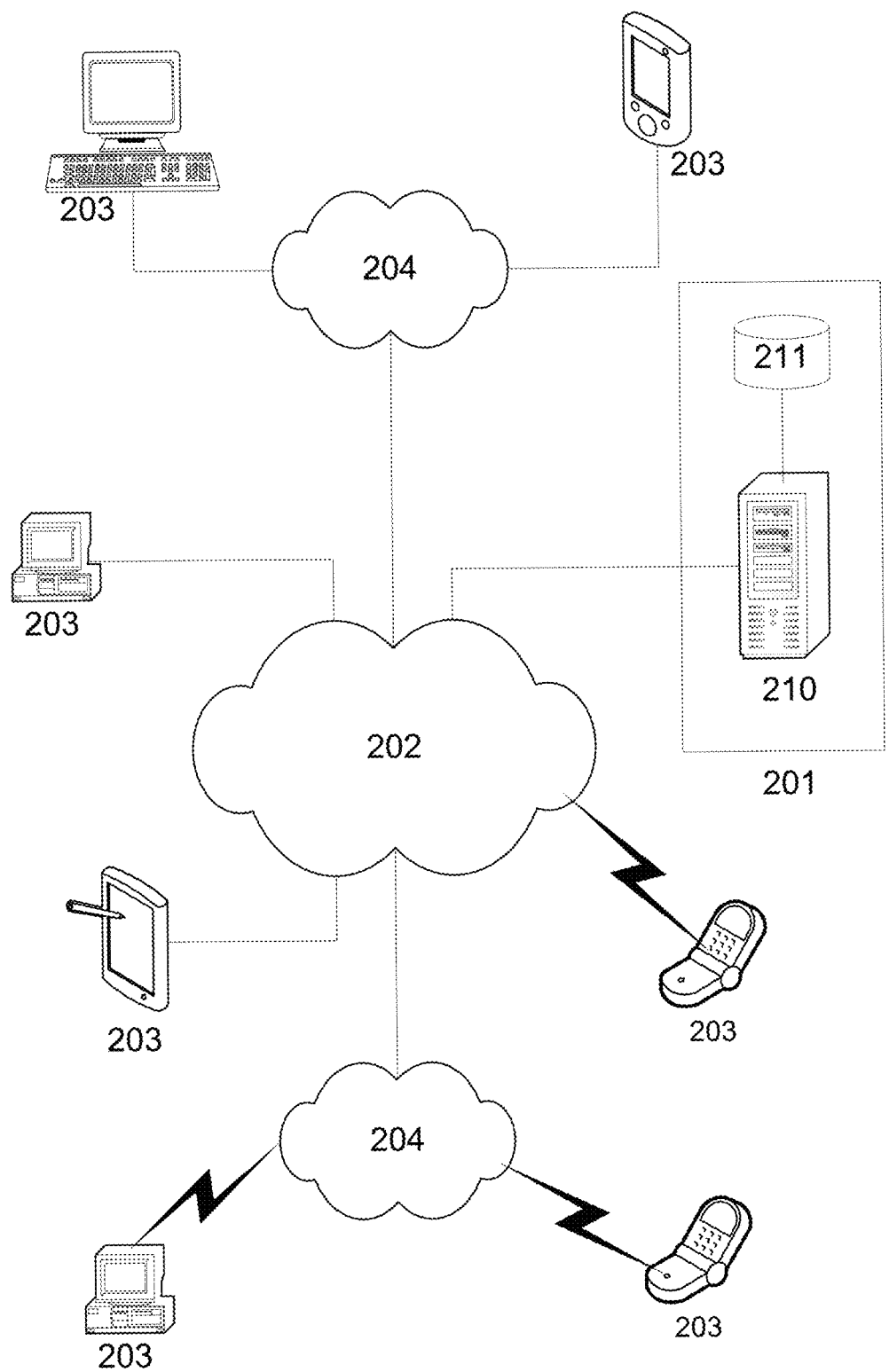
FIG. 2 is a schematic diagram of an example of a distributed computer architecture.

As mentioned above, the process is performed at least in part using a processing system, such as a suitably programmed computer system. In one example, the process can be performed using a standalone computer system. However, in another example, the process can be implemented at least in part using a distributed architecture, an example of which will now be described with reference to FIG. 2.

In this example, a base station 201 is coupled via a communications network, such as the Internet 202, and/or a number of local area networks (LANs) 204, to a number of end stations 203, which will be described in more detail below.

In use, the base station 201 includes one or more processing systems 210 that can be used in analysing the network data. Whilst the base station 201 is a shown as a single entity, it will be appreciated that the base station 201 can be distributed over a number of geographically separate locations, for example by using processing systems 210 and/or databases 211 that are provided as part of a cloud based environment.

The end stations 203 are typically used by users during the analysis process, for example to submit the data for analysis, or to allow users to control the analysis and view results generated by the base station 201. In either case, this is typically achieved by having the end stations 203 communicate with the base station 201.

In one example, the analysis process is implemented at least in part using suitable analysis applications software hosted by one or more processing systems 210, with the end stations 203 being used to allow user interaction with the analysis applications software, via the communications networks 202, 204. Each end station 203 therefore typically executes applications software allowing communication with the analysis software, as well as to allow viewing of content, such as a browser application, or the like. However, this is not essential and any suitable arrangement, such as having the analysis applications software executed by the end stations 203 may be used.

Figure 3:
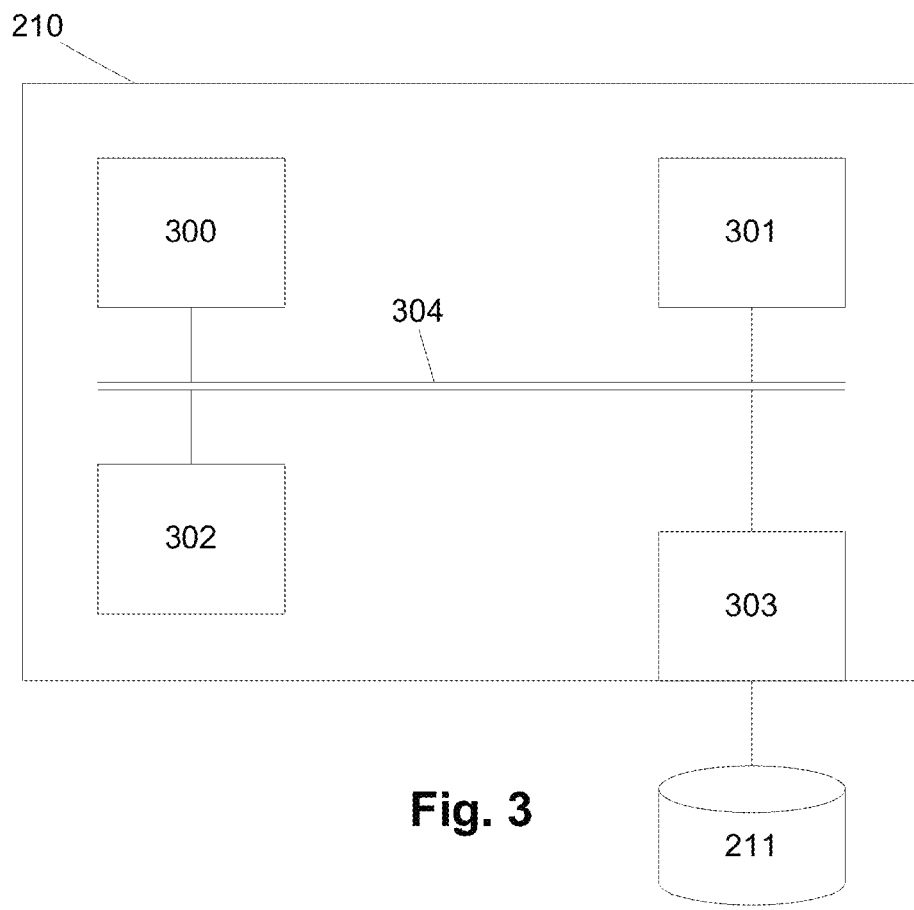
FIG. 3 is a schematic diagram of an example of a processing system.

An example of a suitable processing system 210 is shown in FIG. 3. In this example, the processing system 210 includes at least one electronic processing device, such as a microprocessor 300, a memory 301, an input/output device 302, such as a keyboard and/or display, and an external interface 303, interconnected via a bus 304 as shown. In this example the external interface 303 can be utilised for connecting the processing system 210 to peripheral devices, such as the communications networks 202, 204, the databases 211, other storage devices, or the like. Although a single external interface 303 is shown, this is for the purpose of example only, and in practice, multiple interfaces using various methods (e.g. Ethernet, serial, USB, wireless, 3G or the like) may be provided.

In use, the processor 300 executes instructions in the form of applications software stored in the memory 301 to allow the analysis process to be performed. Accordingly, it will be appreciated that the processing system 210 may be formed from any suitable electronic processing system, such as a suitably programmed computer system, PC, web server, network server, or the like. In one particular example, the base station 201 is implemented as part of a cloud architecture, and it will be appreciated from this that the processing system 210 can be a single processing system or multiple processing systems 210 interconnected by a computer network.

Figure 4:
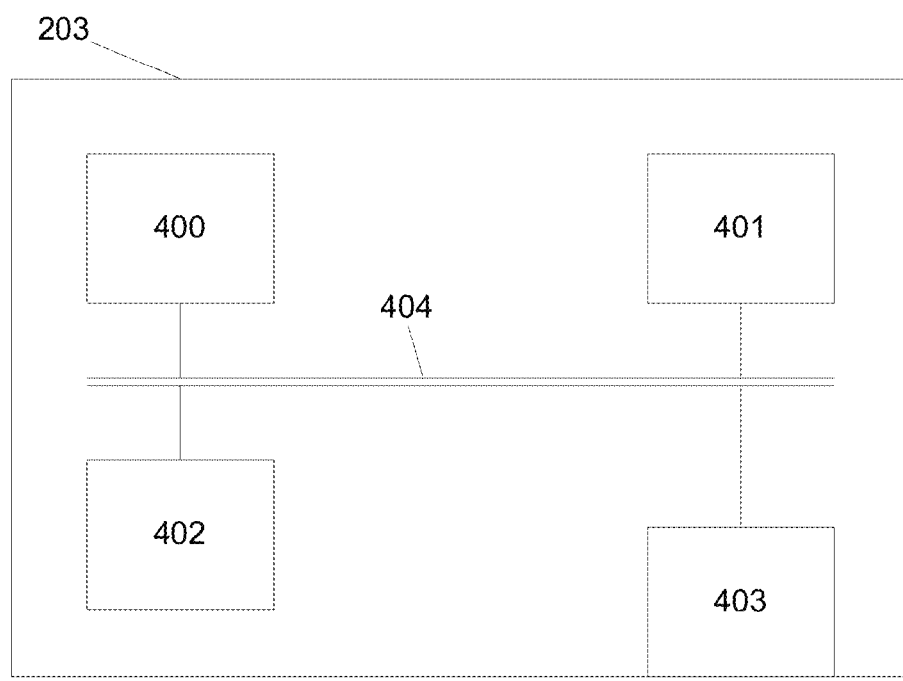
FIG. 4 is a schematic diagram of an example of an end station.

As shown in FIG. 4, in one example, the end station 203 includes at least one electronic processing device, such as a microprocessor 400, a memory 401, an input/output device 402, such as a keyboard and/or display, and an external interface 403, interconnected via a bus 404 as shown. In this example the external interface 403 can be utilised for connecting the end station 203 to peripheral devices, such as the communications networks 202, 204, storage devices, or the like. Although a single external interface 403 is shown, this is for the purpose of example only, and in practice multiple interfaces using various methods (e.g. Ethernet, serial, USB, wireless, 3G or the like) may be provided. It will also be appreciated that additional hardware components, may be incorporated into the end stations 203, depending on the particular implementation.

In use, the processor 400 executes instructions in the form of applications software stored in the memory 401 to allow communication with the base station 201 and/or to perform the analysis process. For example, this can be used to allow an operator to interact with content analysis applications software hosted by the base station 201 and/or to access time series data stored in the database 211, as will be described in more detail below. Accordingly, it will be appreciated that the end stations 203 may be formed from any suitably programmed electronic processing system, such as a suitably programmed PC, Internet terminal, lap-top, hand-held PC, tablet PC, slate PC, Ipad™, mobile phone, smart phone, PDA (Personal Data Assistant), or other communications device.

In the following specific example processes, it will be assumed that actions performed by the end station 203 are performed by the processor 400 in accordance with instructions stored as applications software in the memory 401 and/ or input commands received from a user via the I/O device 402. The base station 201 is a server which communicates with the end stations 203 via the communications networks 202, 204 via wired or wireless connections, depending on the particular network infrastructure available. Actions performed by the processing system 210 are performed by the processor 300 in accordance with instructions stored as applications software in the memory 301 and/or input commands received from a user via the I/O device 302, or commands received from the end stations 203.

In the following examples, it is assumed that the processing system 210 of the base station 201 hosts an analysis application that performs a majority of the processing tasks, and which generates a user interface that is displayed using a browser applications, or similar, hosted by the end stations 203, to allow interaction with the analysis application. However, it will be appreciated that the above described configuration assumed for the purpose of the following examples is not essential, and numerous other configurations may be used.

It will also be appreciated that the process could be performed on a standalone processing system, and in particular could be performed using any electronic processing system including an electronic processing device, such as a microprocessor, microchip processor, logic gate configuration, firmware optionally associated with implementing logic such as an FPGA (Field Programmable Gate Array), or any other electronic device, system or arrangement capable of analysing network data.

Figure 5A:
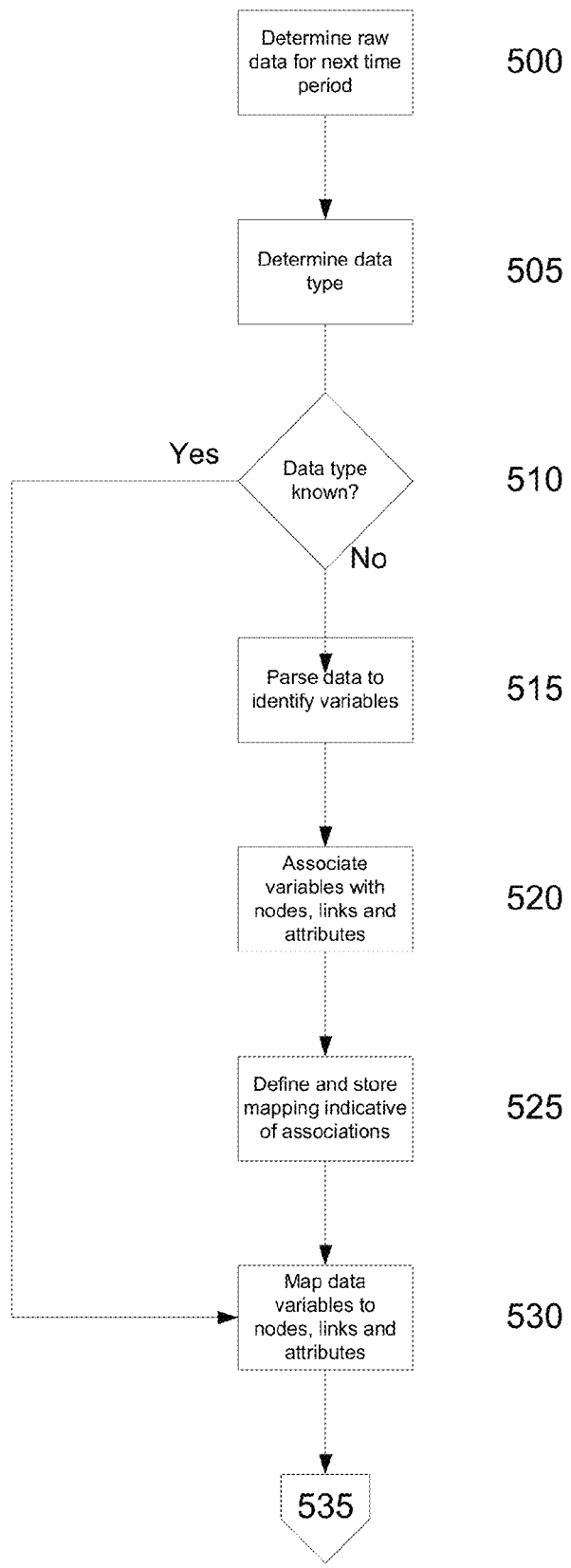
FIGS. 5A and 5B are a flowchart of a second example of a process for use in analysing network data.
Figure 5B:
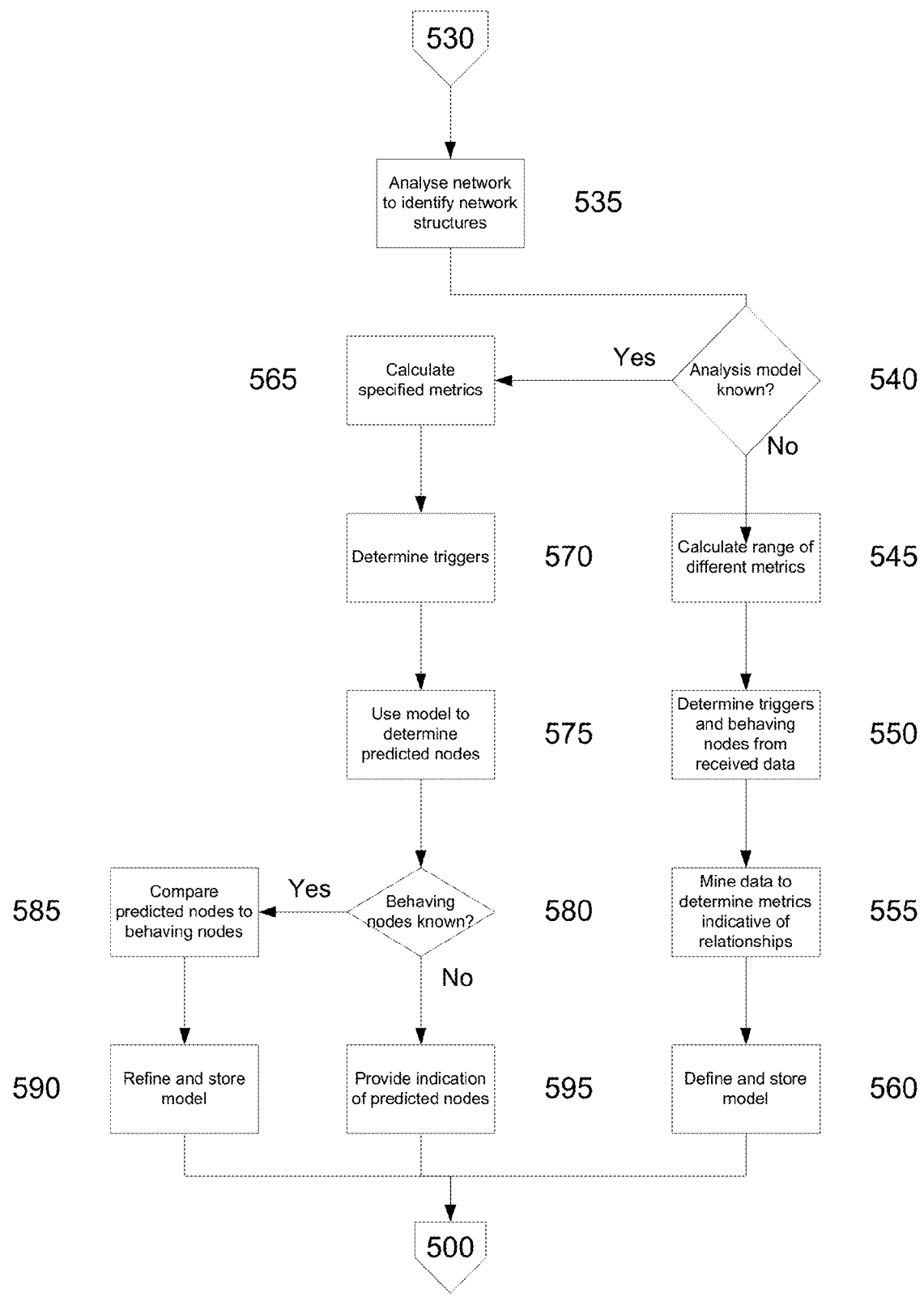

A second example of a processor for analysing network data will now be described with reference to FIGS. 5A and 5B.

In this example, at step 500 the processing system 210 determines raw data for a next time period. The raw data may be determined in any suitable manner but typically is submitted via a web interface hosted by the processing system 210, from one of the end stations 203. This allows third parties to submit raw data to the base station 201 allowing the raw data to be analysed and predicted followers provided in response.

At step 505 the processing system 210 determines a data type, corresponding to the type and/or format of the raw data, and assesses whether this data type is known at step 510. In particular, if data of this data type has previously been received, the processing system 210 will include defined mappings indicating how the raw data should be mapped to the network data, as well as a model for analysing the data. In this case, the process moves on to step 530.

In the event that the data type has not been previously analysed, then the process moves on to step 515, in which case the processing system 210 parses the raw data to identify variables within the data. Thus, for example, if the raw data represents telecommunications information, the raw data would typically include information such as first and second customer identifiers, a time, a date and call length. Thus, this identifies customers that have communicated, together with the time date and length of the communication. The variables may be identified by particular markers, such as commas, or the like, and parsing the data therefore allows the processing system 210 to identify different variables within the data.

At step 520, the different variables are then associated with nodes, links and attributes for the network data. Thus, for example, the customer identifiers will typically be mapped to network nodes, with the time, date and length of the call being used to define a link between the two network nodes.

The associations between the variables and the nodes and links may be created through a combination of manual and automated processes. For example, simple pattern matching techniques can be utilised to allow certain variables within data to be identified. Thus pattern matching could be used to identify a time, date and other information of a similar nature. For any variables within the data that cannot be identified, these can then be displayed to an operator allowing the operator to manually create an association between the variable and a corresponding node or link. It will also be appreciated that this process can be formed utilising machine algorithms in which previously defined associations are examined to determine if these are applicable in the current instance.

Other variables within the data may be mapped to attributes of the nodes and links, in a similar manner. The attributes can include a range of different information, including for example demographic information regarding users, information regarding contracts to which the user is signed up. Thus, for example, demographic information relating to an individual would be mapped to an attribute of the node that represents the individual. Similarly relationships may also include attributes such as the direction of communication i.e. who initiated the communication, the type of communication such as call or SMS or the like.

At step 525, a mapping indicative of the associations is defined and stored, for example in the database 211. The mapping can then be applied to the raw data to transform the raw data in to network data at step 530.

During this process additional filtering may be performed in order to limit the amount of network data to be analysed. Thus, for example, this can involve filtering the raw data to remove nodes and or links in accordance with certain requirements. An example of this are so called "pizza calls" in which a large number of phone calls are made to a single number, which in turn does not make any outgoing calls. As such variables are typically not useful in the network analysis these can be excluded.

At step 535 the processing system 210 analyses the network to identify network structures, which typically correspond to groupings within the network. The nature of the network structures will vary depending on the type of data being analysed, but typically include peer groups, community groups or the like. Peer groups typically include a limited number of individuals (eg: 5-50) who are highly interconnected, but who have little or no connection to other members of the network. Similarly, community groups include larger numbers of individuals (eg: 200-300) again with a high ratio of internal to external links. Each grouping will vary over time and these are taken into account in preparation for the next step.

At step 540, it is determined if an analysis model for the respective raw data is known. The analysis model will typically specify selected metrics that needed to be calculated to allow predicted nodes to be identified from triggers. An analysis model will typically only be known if the specific data type has previously been analysed If it is determined that an analysis model is not known at step 540, at step 545 the processing system 210 calculates a range of different metrics, including any SNA metrics, connectivity metrics, dynamic metrics, and the like. Details of different available metrics and rules for their calculation will typically be stored in the database 211, allowing the processing system 210 to determine the metrics for the network data.

At step 550 the processing system 210 then operates to determine triggers and behaving nodes from the received data. In particular, the first time a specific type of data is to be analysed, it is not possible to determine predicted nodes with any great accuracy. Accordingly, it is typical to receive information regarding the behaving nodes as part of the received data. In particular, the received data can identify nodes that have acted in a way of interest.

Triggers can be identified in a range of different manners. For example, triggers can be determined by analysing the network and identifying those nodes which are more highly connected than other nodes in the network. However, triggers may also be identified based on other factors, such as the previous behaviour of nodes within the network. For example, whilst an individual may be highly connected, if they do not perform actions of interest, they may not be classified as a trigger, depending on the particular analysis being performed. Accordingly, triggers may be identified based on the behaviour exhibited by nodes, nodes having particular attributes, external events or the like, in which case information regarding such triggers can be received together with the raw data.

At step 555, the processing system 210 mines the network data to determine metrics that are most indicative of relationships between triggers and the behaving nodes, using the metrics to define a model. In particular, this typically involves examining metrics representing degrees of separation and connections between the triggers and behaving nodes, and identifying a particular combination of metrics that suitably identifies behaving nodes based on triggers and the network structure, including "changes" in such metrics.

The model can be of any suitable form and in one example can include a weighted sum or similar, which can be used to calculate a follower score for a given node, the follower score being indicative of a likelihood of the node being a behaving node. The weighted sum will typically include a number of the metrics and corresponding coefficients, which are combined to determine an index, representing a score associated with a node, the score being indicative of the likelihood of the node being a behaving node.

It will be appreciated that this can be achieved by calculating a plurality of indices for at least some of the nodes using a plurality of weighted sums, the weighted sums including different coefficients and different metrics. The electronic processing device then uses the indices and the behaving nodes to select a respective one of the plurality of weighted sums and/or modify at least one of the plurality of weighted sums, for example by modifying the coefficients, so that the resulting indexes calculated for the nodes most accurately identifies the behaving nodes.

Once this has been determined the model, including the selected metrics and the manner in which these should be combined to determine an index score, can be stored at step 560, allowing the model to be used for analysing further data of the given data type. For example, this allows the process to return to step 500, allowing the model to be applied to data for a next time period.

If it is determined at step 540 that a model exists for the given type of network data, for example if this has been previously determined using the process of steps 545 to 560, then the process moves onto step 565 at which point the processing system 210 determines the selected metrics identified as part of the model. In particular, the model will specify the relevant metrics, with details of their calculation being stored in memory, allowing the processing system 210 to perform the relevant calculations.

At step 570, triggers are identified, typically based on metrics representing the interconnectedness of the nodes within a given network structure, the behaviour of nodes, the attributes of nodes and any information provided regarding other triggers, such as events, or the like.

Thus, for example, for a peer group, the nodes having the most connections to other nodes within the peer group would typically be deemed to have the most influence for that respective peer group. It will be appreciated that such behavioural leaders can be identified at a range of different levels within the network, so these could be identified at peer, community or other group levels. Additionally, by calculating changes in the value of metrics over successive time periods, this can allow changes in the connectedness of groups and individuals to be taken into account. For example, if the connectivity metric for a peer group reduces over time, this indicates that the peer group might be fragmenting, meaning individuals within the group are less likely to be influenced by triggers within or associated with the group.

Additionally, triggers may also be further identified based on other criteria, such as nodes that have certain attributes, or have previously or are currently exhibiting certain behaviours. Thus, for example, if a telecommunications service provider is attempting to identify individuals that will next leave for another service provider, the analysis may focus not generally on individuals having a high connectivity to other users, but specifically on individuals having a high connectivity and have recently left, are in the process of leaving the service provider, or are currently with a different service provider. From this it is possible to identify nodes that are likely to be influenced by those leaders, and are hence in turn are predicted to leave.

In any event, having determined the triggers at step 570, the processing system 210 can determine predicted nodes at step 575, by applying the model to the network data, and more particularly by calculating an index score for nodes in the respective network structure. Thus, once a trigger has been identified, the processing system 210 uses the weighted sum of metrics to calculate an index score for each node in the respective peer group. This then allows the processing system 210 to determine predicted nodes, for example by selecting one or more nodes having a highest index score, or by comparing the index score to a threshold.

At step 580 the processing system determines if behaving nodes are known, for example, if the network data currently examined is historical data, then the actual nodes exhibiting behaviour of interest for that time period may be known based on an analysis of behaviour of the individuals. If behaving nodes are known, then at step 585 the processing system 210 compares the predicted nodes calculated at step 575 to the known behaving nodes. This allows the processing system to determine the accuracy of the model and in particular to refine the model, allowing an updated model to be determined at step 590. Thus, this allows the electronic processing device to modify the model, for example by modifying the metrics and/or coefficients used in calculating the weighted sum.

Alternatively, if behaving nodes are not known, then an indication of the predicted nodes can be output, for example by transferring information regarding the predicted nodes to the end station 203 from which the raw data was received.

Accordingly, it will be appreciated that the above described process allows raw data to be submitted by a third party to the base station 201, via a web interface. The base station 201 can then process the raw data to determine a model and then use this to determine predicted nodes, which can then be returned to the third party. This allows the third party to identify individuals that can be most effectively targeted with advertising, special offers or the like, in order to achieve a desired outcome.

Figure 6:
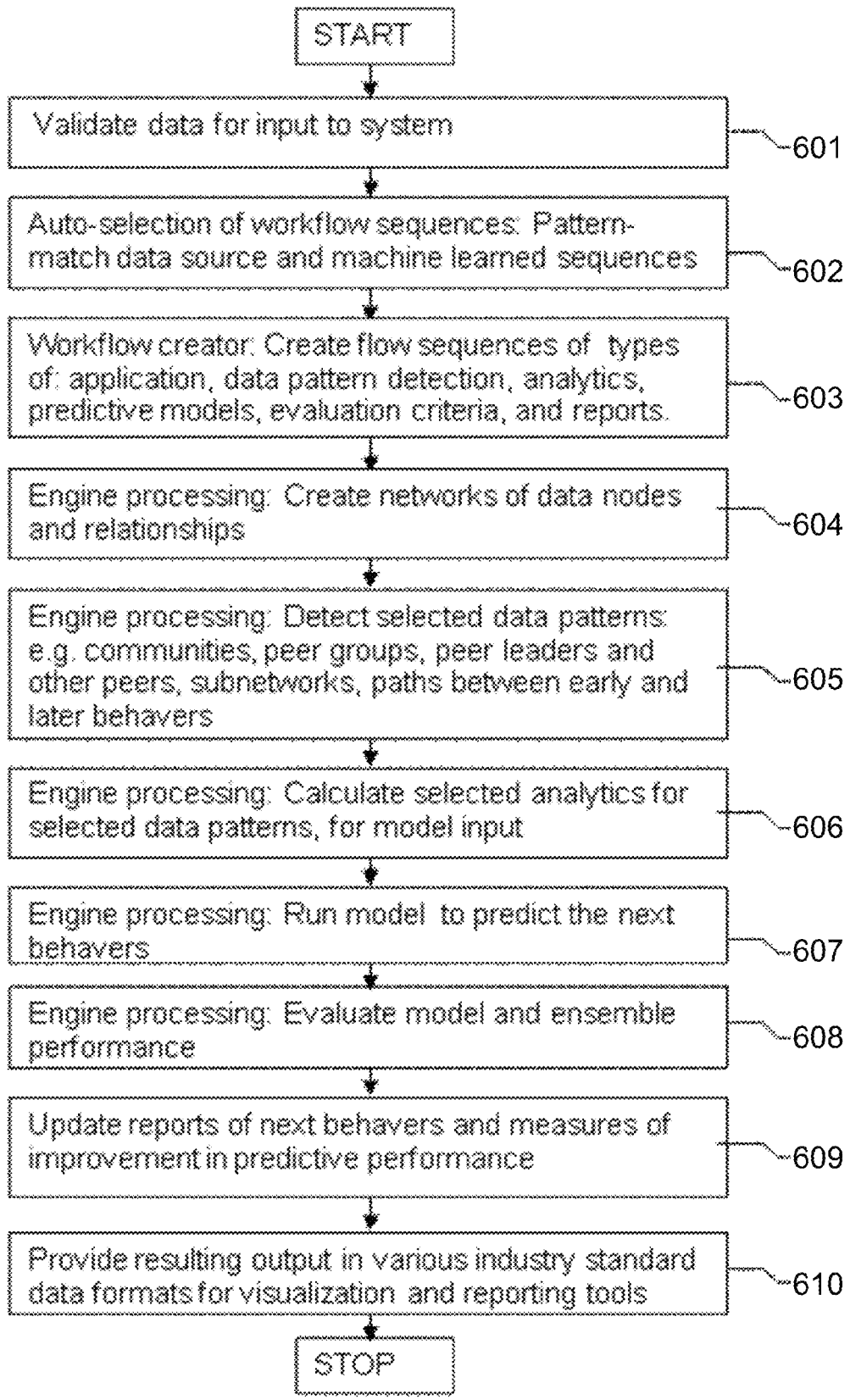
FIG. 6 is a flowchart of a third example of a process for use in analysing network data.
Figure 7:
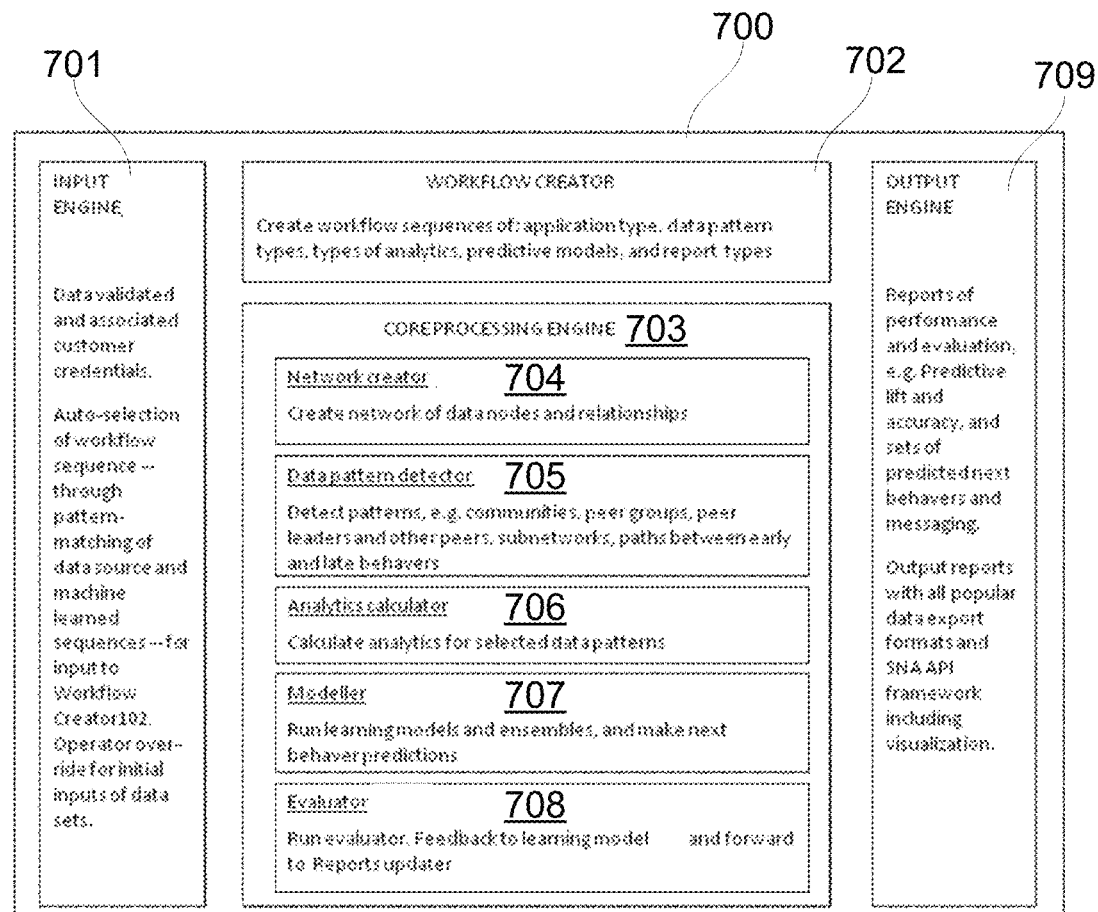
FIG. 7 is a schematic diagram of the functional modules utilised in performing the process of FIG. 6.

A further example of the above described process with specific reference to functional modules implemented by the processing system, will now be described with reference to FIGS. 6 and 7.

In this example, at step 601, the customer or prospect data, or machine generated data from identifiable objects such as IP address hand-shaking between devices, is made available to a computer or other processing system 700.

Data input into an input engine 701 includes the social network data, typically in a raw data format. The data defines a structure comprising nodes and relationships or edges between them. One example is the data records of calls and messages a telecommunication operator collects over time, indicating which subscribers (typically referenced by identification numbers only), have called or messaged other subscribers, and the time and duration or length of the calls or SMS messages. Another example is from social media blog sites indicating which sites have links to other sites and the date and time of posting public comment embedded from Social Media sites where bread-crumbs link back to unique user profiles. The input engine 701 checks customer identification information and confirms their validity prior to enabling upload of the data.

At Step 602, pattern-matching occurs in which the format of the data and content of the data is uploaded in conjunction with patterns and content understood via machine learnings from previous data uploads. Step 602 enables the likely workflow sequencing involved in Step 603 to be determined as suitable for the data set in question prior to Step 603.

At Step 603, a rules-based workflow creator 702 creates a workflow suited to the data, either via information passed to it from the input engine 701 as a machine learned auto-selection of workflow sequences, or via operator determination of appropriate workflow sequences as, for example, where data and its structure and content may be new to the system.

The workflow creator 702, via appropriate rules, controls the workflow sequences of the functions to be used in the following stages. For example, if the application is to improve predictions about customer behaviour for a telecommunications operator then certain data fields and format will be expected, including communications call records, and subsequent functions will be performed. For a particular customer, the patterns which are to be detected may be peer groups rather than communities, and the analytics most suited for peer group metrics will be calculated at a later step in the workflow (Step 606).

If however the application concerns improving predictions about market targeting of online social networks or blog site interactivity, the expected data structures and subsequent functions to be performed on the data may require a different workflow in terms of such functions as: the types of patterns to be detected—communities, peer groups, peer leaders and other peers, paths between early behavers (e.g. churners or buyers of a product) and later behavers, or subnetworks based on selected nodes only; the types of analytics to be performed on the particular patterns included in the workflow; the most suited predictive models or ensembles of them; and types of reports most likely suited to the customer needs.

Hence, the structure for processing of the initial data and subsequent sets of the same or similar data is determined at Step 603, such that the same workflow will ensure similar sequences of processing for subsequent uploads/feeds of the same or similar data.

At Step 604, a core processing engine 703 uses a set of function modules to create a network, detect data patterns in the network relevant to the application type, calculate analytics (metrics and statistics) deemed relevant to the detected data patterns (e.g. peer groups, or communities), model behavior in the network to predict subsequent behavers (e.g. churners or buyers), and evaluate the extent of improvement and degree of accuracy of those predictions.

Figure 8:
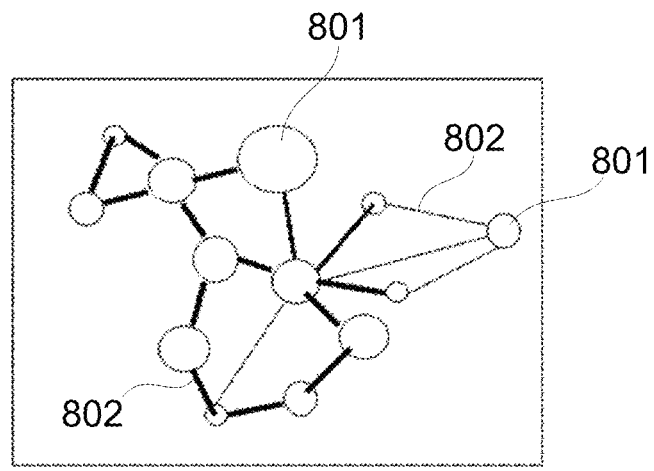
FIG. 8 is a schematic diagram of a graph of an example network of data nodes and the relationships or edges between them; and, FIG. 9 is a graphical representation of a predictive "lift" curve indicative of improvements in system predictions.

A network creator 704 is the first block function of the core processing engine 703. The network creator 704 creates a data network, an example of which is shown in FIG. 8, including a number of nodes 801 interconnector by links 802, representing relationships between the nodes. This is performed in accordance with the workflow selected by the workflow selector 702, allowing different types of data to be handled as required. For example, the network may comprise subscribers identification codes as nodes and relationships with other subscribers according to phone calls made as the relationships between them. The network may be further refined by rules from the workflow selector 702 such as comprising stronger or weaker relationships according to duration of calls for example.

At Step 605, a data pattern detector 705 is the second block function of the core processing engine 703. The data pattern detector 705 provides for the detection of several types of social network data patterns. These include but are not limited to: communities, peer groups, peer leaders and other peers, subnetworks, and paths between early and late behavers. Communities are usually larger groupings of nodes than peer groups but both are defined by their degree of modularity; which is the extent to which a network can be divided into modules having dense connections between nodes within modules but sparse connections between nodes in different modules. Subnetwork patterns may vary but are commonly defined as what are termed ego-centric subnetwroks that are anchored or based on a single individual, ego. Network paths between one node and another are definable by length and time, and the intermediary nodes.

At Step 606, an analytics calculator 706 is the third block function of the core processing engine 703. The analytics calculator 706 calculates a range of metrics and statistics at three levels: at the global level of the full extent of the data set; at the data patterns or grouping level per the particular network patterns detected by the data pattern detector 705; and the level of individual nodes that describes the network characteristics of each, such as the in- and out-degree count which is the number and direction of relationships with other nodes.

Temporal metrics across the network data are also calculated such as temporal path lengths between nodes, e.g. within a selected community or subnetwork. Metrics and statistics calculated are not limited however to those three levels. Ratios, or other functions, expressing the relationship between metrics are also able to be calculated and used for input to a modeller 707.

At Step 607, the modeller 707 is the fourth block of the core processing engine 703. In accordance with the workflow selector 702, the modeller 707 processes data through one or more learning models, or an ensemble of models from the same class of models, in order for model predictions to be determined as to which nodes will next behave in ways identical or similar to nodes that have behaved that way previously in the data. For example, nodes that have previously purchased a product or churned as a customer and the prediction of other nodes that may at a later stage subsequently do so. As with other blocks of the core processing engine 703, the modeller 707 may at one time process data via a certain module which might be substituted for another model or type of module for another workflow sequence or at a later time.

Figure 9:
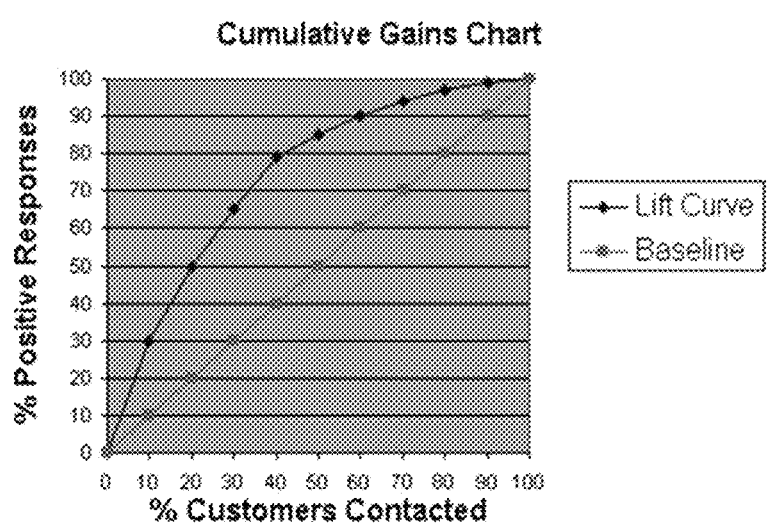

At Step 608, an evaluator 708 is the fifth block of the core processing engine 703. The evaluator 708 performs statistical calculations concerning the accuracy and performance of the modeller function 707. The evaluative measures include cumulative gain statistics and lift charts, an example of which is shown in FIG. 9, which represent improvements over previous predictions, using the actual response rates to see the extent to which the modeller 707 would have helped with predictions on similar data.

Those measures then inform the workflow selector 702 as to whether the model(s) used in the modeller 707 should or should not be changed on the next processing occasion of similar data from the same customer. The evaluator 708 also informs the output engine 709 of its results so that those results can be made known to appropriate parties.

At Step 609, an output engine 709 provides reports from the system 700 as to which particular nodes in the network are predicted to next behave in a way identical or similar to that of previous behavers in the data, and provide information on the performance of the predictions made and their accuracy including measures such as the degree of gain and lift beyond a situation of not having used any system predictions. The output engine 709 also provides visualizations of different network patterns and charts and tables of the evaluation performance and accuracy measures.

At Step 610, the output engine 709 provides outputs of results via various industry standard data formats for visualization and for various reporting tools and via SNA API frameworks.

Accordingly the above describes a method, system and computer program product for the analysis of data on a digital computer system, and in particular to the creation of social networks of extremely large numbers of data nodes and analysis of the relationships between them that change over time, such that predictions may be made based upon analysis of the dynamics of the relational patterns as to which particular nodes will next behave in ways that conform to the behavior of nodes that have behaved that way previously.

The method and system enables "lift" and other improvements to the accuracy and performance of predictions hitherto difficult, inaccurate or impossible to achieve.

In one example, data can take the form of any data that already comprises a network structure or can be made to conform to such a structure. That is, nodes or entities exist in the data and relationships or edges between them are also inherent in the data structure or can be inferred from it. Data sets of this type are to be found in numerous industries and most notably in the customer bases and operation of many communications, ecommerce and social media enterprises, where the market targeting of customers needs increasingly to be directed to certain customers for maximum effect. They are also to be found increasingly in non-human machine networks, comprising device to device relationships.

Furthermore, extraneous data beyond the network structured data can be included to further enhance results. For example, events-based data may have a consistent impact on predictive model results. When it snows in Tahoe for example, there may be a higher probability that people can be up-sold to a Global Roaming telco data plan.

The above described techniques allow marketers to upload their data online and have the system automatically create social networks and, from their point of view, automatically learn the network behavior of the nodes and self-improve as to which customers will next behave in a way consistent with previous customers' behavior, and report that information to them.

The arrangements described above assess where the influence flows occur over time and will be maximal in the customer base. The techniques can be performed on static data (one-time) but more typically are performed using dynamic data (many-times). In this latter case, the system can automatically refine predictions through learning processes that work to keep improving the accuracy and validity of predictions to the maximum attainable. Furthermore, the process can involve examining how network metrics change over successive time periods, allowing dynamic changes within the network to be taken into account.

It will be appreciated that the above described techniques can therefore assist in overcoming problems, drawbacks, and disadvantages of traditional SNA systems and methods. In particular, in one example, the system can exploit dynamics in the data to learn over time the behaviours of nodes and relationships, thereby enabling metrics based on the changed behaviour to be modelled. Furthermore the techniques can overcome many of the manual and necessarily offline aspects of previous systems by its structural framework whereby different workflows are applied, simultaneously and in parallel, to different types of data, applications and outcome requirements to ensure the best system results, and the adaptive revision and continual improvement of those results.

A network is described herein not to be limited to human social networks, or to machine networks. The term network may extend to internet networks, chemical networks, biological networks, communications networks and the like. A network is a set of nodes dependent or interdependent with other nodes via links, relationships or connections (often called edges). Examples include person to person call networks comprising phone numbers connected to other numbers via calls or text messages; machine device-to-device and sensor networks that send and receive signals between them; internet networks where nodes for example may be webpages connected to other webpages for example by hyperlinks; and chemical networks where for example molecules are connected to each other by molecular binding or reactivity.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. An apparatus for use in analyzing network data, the apparatus including an electronic processing device that:
    a) determines network data representing a network having a number of nodes and links between the nodes;
    b) selects a model in accordance with a data type associated with the network data, the model being indicative of:
        i) at least one trigger for a behaviour of interest;
        ii) selected network metrics; and
        iii) a mathematical relationship relating network nodes to the at least one trigger using the selected network metrics; and,
    c) determines at least one trigger associated with the network data;
    d) determines the selected metrics for the network data; and,
    e) uses the mathematical relationship, the selected network metrics and the identified at least one trigger to determine predicted nodes, the predicted nodes being nodes predicted to exhibit behaviour of interest.

2. The apparatus according to claim 1, wherein for network data from at least one first time period the electronic processing device:
    a) calculates a range of different network metrics for the network;
    b) determines nodes exhibiting a behaviour of interest;
    c) determines potential triggers;
    d) determines a mathematical relationship relating the identified nodes to the potential triggers using selected ones of the metrics; and, e) at least one of defines and refines the model in accordance with the identified triggers, the mathematical relationship and the selected ones of the metrics.

3. The apparatus according to claim 2, wherein the electronic processing device, determines predicted nodes for at least one second time period subsequent to the at least one first time period.

4. The apparatus according to claim 3, wherein the electronic processing device:
   a) receives data indicative of the network data;
   b) segments the data into at least one first time period and at least one second time period.

5. The apparatus according to claim 3, wherein the mathematical relationship is indicative of a weighted sum based at least partially on the selected network metrics and the at least one trigger, and wherein the electronic processing device:
   a) calculates an index for at least some of the nodes using the weighted sum; and
   b) determines the predicted nodes using the index.

6. The apparatus according to claim 2, wherein the electronic processing device:
   a) receives data indicative of the network data;
   b) segments the data into at least one first time period and at least one second time period.

7. The apparatus according to claim 2, wherein the mathematical relationship is indicative of a weighted sum based at least partially on the selected network metrics and the at least one trigger, and wherein the electronic processing device:
   a) calculates an index for at least some of the nodes using the weighted sum; and
   b) determines the predicted nodes using the index.

8. The apparatus according to claim 1, wherein the mathematical relationship is indicative of a weighted sum based at least partially on the selected network metrics and the at least one trigger, and wherein the electronic processing device:
   a) calculates an index for at least some of the nodes using the weighted sum; and,
   b) determines the predicted nodes using the index.

9. The apparatus according to claim 8, wherein the index is at least partially indicative of at least one of a proximity and a connectivity of the respective node to at least one trigger associated with at least one node within the network.

10. The apparatus according to claim 8, wherein for network data from at least one first time period the electronic processing device:
    a) calculates a plurality of indices for at least some of the nodes using a plurality of weighted sums; and,
    b) uses the indices and the behaving nodes to at least one of:
       i) select a respective one of the plurality of weighted sums; and,
       ii) modify at least one of the plurality of weighted sums.

11. The apparatus according to claim 1, wherein the trigger is indicative of at least one of:
    a) a node exhibiting a particular behaviour;
    b) a node having predefined attributes; and,
    c) an event associated with or otherwise connected to at least one node within the network.

12. The apparatus according to claim 1, wherein the electronic processing device:
    analyses the network data to determine one or more network structures; and,
    determines the selected metrics for the network structures.

13. The apparatus according to claim 12, wherein the network structures include groups of nodes, and wherein the electronic processing device determines the groups based on the connectivity of nodes.

14. The apparatus according to claim 13, wherein the electronic processing device:
    a) determines connectivity metrics representing the connectivity of nodes; and,
    b) determines the groups using the connectivity metrics.

15. The apparatus according to claim 1, wherein the electronic processing device:
    a) determines raw data indicative of network data;
    b) determines nodes and links in the raw data; and,
    c) generates the network data using the nodes and links.

16. The apparatus according to claim 15, wherein the electronic processing device determines the nodes and links using a defined mapping.

17. The apparatus according to claim 15, wherein the electronic processing device filters the raw data so that at least some of the raw data is not converted to network data.

18. The apparatus according to claim 15, wherein the electronic processing device:
    a) parses the raw data to identify data variables;
    b) determines associations between the data variables and network nodes and links; and,
    c) defines a mapping indicative of the associations.

19. The apparatus according to claim 18, wherein the electronic processing device determines associations between the data variables and network nodes and links using a machine learning algorithm.

20. A method for use in analyzing network data, the method including, in an electronic processing device:
    a) determining network data representing a network having a number of nodes and links between the nodes;
    b) selecting a model in accordance with a data type associated with the network data, the model being indicative of:
       i) at least one trigger for a behaviour of interest;
       ii) selected network metrics; and
       iii) a mathematical relationship relating network nodes to the at least one trigger using the selected network metrics; and,
    c) determining at least one trigger associated with the network data;
    d) determining the selected metrics for the network data; and,
    e) using the mathematical relationship, the selected network metrics and the identified at least one trigger to determine predicted nodes, the predicted nodes being nodes predicted to exhibit behaviour of interest.

* * * * *